(12) United States Patent
de Montmorillon et al.

(10) Patent No.: US 6,535,676 B1
(45) Date of Patent: Mar. 18, 2003

(54) OPTICAL FIBRE WITH OPTIMIZED RATIO OF EFFECTIVE AREA TO DISPERSION SCOPE FOR OPTICAL FIBRE TRANSMISSION SYSTEM WITH WAVELENGTH MULTIPLEXING

(75) Inventors: Louis-Anne de Montmorillon, Paris (FR); Pascale Nouchi, Maisons-Laffitte (FR); Jean-Claude Rousseau, Chatou (FR); Raphaelle Sauvageon, Thones (FR); Jean-François Chariot, Marly le Roi (FR); Alain Bertaina, Villebon sur Yvette (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/554,490

(22) PCT Filed: Sep. 17, 1999

(86) PCT No.: PCT/FR99/02220

§ 371 (c)(1),
(2), (4) Date: Jun. 28, 2000

(87) PCT Pub. No.: WO00/17681

PCT Pub. Date: Mar. 30, 2000

(30) Foreign Application Priority Data

Sep. 17, 1998 (FR) ............................................. 98 11644
Feb. 18, 1999 (FR) ............................................. 99 02028

(51) Int. Cl.[7] .............................. G02B 6/00; G02B 6/16
(52) U.S. Cl. ....................... 385/123; 385/24; 385/124; 385/126
(58) Field of Search ................................ 385/123–127; 359/124, 127, 153

(56) References Cited

U.S. PATENT DOCUMENTS 5,483,612 A    1/1996   Gallagher et al.

(List continued on next page.)

FOREIGN PATENT DOCUMENTS

| EP | 0 724 171 A2 | 7/1996 |
| EP | 0 859 247 A2 | 8/1998 |
| WO | WO 97/33188 | 9/1997 |

OTHER PUBLICATIONS

Bhagavatula, V. A. et al.: "Dispersion–Shifted Single–Mode Fiber For High–Bit–Rate and Multiwavelength Systems" Optical Fiber Communication. Summaries of Papers Presented at the Conference OFC '95, San Diego, Feb. 26–Mar. 3, 1995, p. 259/260, XP000647265.

(List continued on next page.)

Primary Examiner—Hemang Sanghavi
(74) Attorney, Agent, or Firm—Sughrue Mion, PLLC

(57) ABSTRACT

The invention relates to a single-mode optical fiber that, for a wavelength of 1550 nm, has an effective area greater than or equal to 60 $\mu m^2$, chromatic dispersion lying in the range 3 ps/(nm.km) to 14 ps/(nm.km), a chromatic dispersion gradient in the range 0 ps/($nm^2$.km) to 0.1 ps/($nm^2$.km), and a ratio between the effective area and the chromatic dispersion gradient that is greater than or equal to 1000 $\mu m^2.nm^2$.km/ps, as well as a zero chromatic dispersion wavelength shorter than 1480 nm. The fiber thus has both a large effective area and a shallow chromatic dispersion gradient, and it is thus well suited to wavelength division multiplexed (WDM) transmission. The invention also relates to a WDM optical fiber transmission system that uses such a fiber as the line fiber.

29 Claims, 1 Drawing Sheet

U.S. PATENT DOCUMENTS

| | | | |
|---|---|---|---|
| 5,675,690 A | 10/1997 | Nouchi et al. | |
| 5,684,909 A | 11/1997 | Liu | |
| 5,721,800 A | 2/1998 | Kato et al. | |
| 5,748,824 A | 5/1998 | Smith | |
| 5,838,867 A | 11/1998 | Onishi et al. | |
| 5,963,700 A | 10/1999 | Kato et al. | |
| 5,999,679 A | 12/1999 | Antos et al. | |
| 6,009,221 A | 12/1999 | Tsuda | |
| 6,009,222 A | 12/1999 | Dong et al. | |
| 6,072,929 A | 6/2000 | Kato et al. | |
| 6,091,873 A * | 7/2000 | Matsuo et al. | 385/123 |
| 6,266,467 B1 | 7/2001 | Kato et al. | |
| 6,404,967 B2 * | 6/2002 | Arai et al. | 385/126 |
| 2001/0006572 A1 * | 7/2001 | Kato et al. | 385/123 |

OTHER PUBLICATIONS

Masao Kato et al, "A new design for dispersion–shifted fiber with an effective core area larger than 100 um2 and good bending characteristics", OFC'98 Technincal Digest, vol. 1, Feb. 22–27 1998, pp. 301–302.

P. Nouchi et al "New dispersion shifted fiber with effective are larger than 90 mu m/sup/2/" Proceedings of the European Conference on Optical Communication, vol. 1, Sep. 15–19, 1996, pp. 49–52.

P. Nouchi, "maximum effective area for non–zero dispersion–shifted fiber", OFC'98. Optical Fiber Cmmunication Conference and Exhibit Technical Digest. Conference Edition, San Jose, CA, Feb. 22–27, 1998, p. 303/304.

* cited by examiner

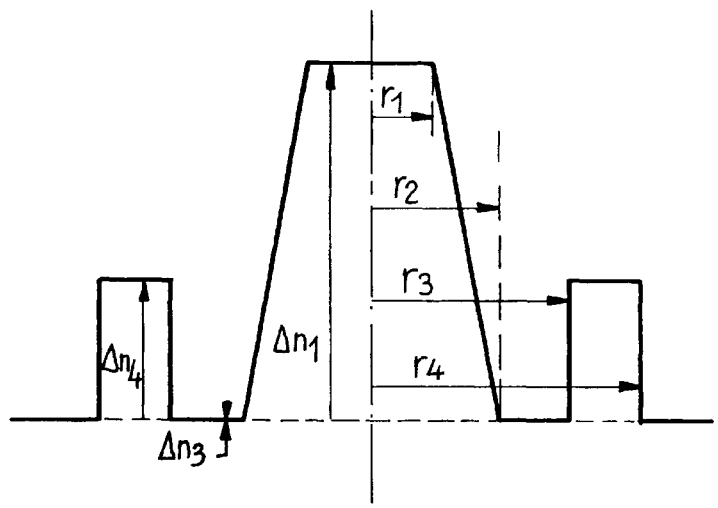
FIG_1
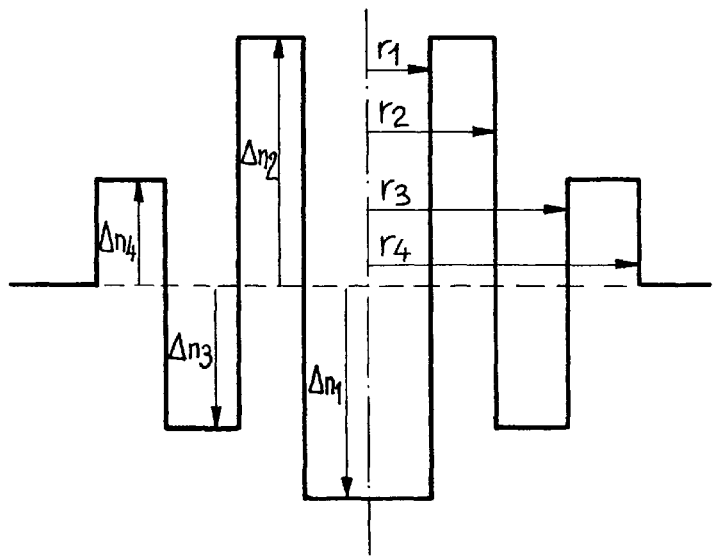
FIG_2
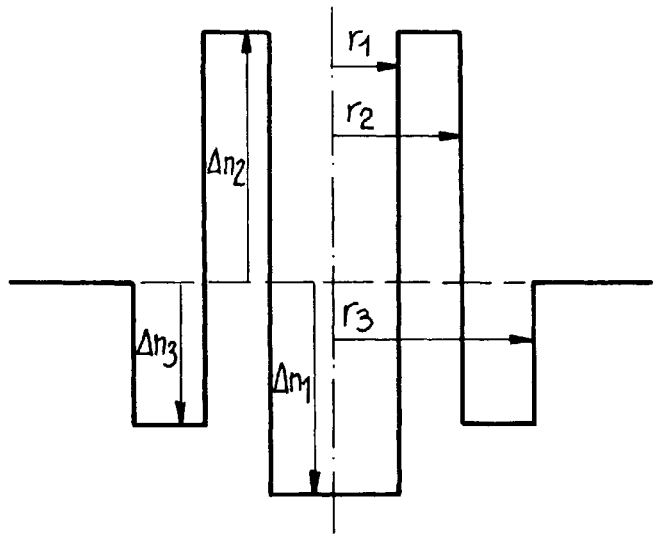
FIG_3

OPTICAL FIBRE WITH OPTIMIZED RATIO OF EFFECTIVE AREA TO DISPERSION SCOPE FOR OPTICAL FIBRE TRANSMISSION SYSTEM WITH WAVELENGTH MULTIPLEXING

BACKGROUND OF THE INVENTION

The present invention relates to the field of transmission over optical fiber, and more particularly to the field of wavelength division multiplexed (WDM) transmission using a dispersion-shifted line fiber.

The refractive index profile of an optical fiber is generally described as a function of the appearance of the graph of the function that associates the refractive index with the radius of the fiber. Conventionally, distance r to the center of the fiber is plotted along the x-axis, and difference between refractive index and the refractive index of the cladding of the fiber is plotted up the y-axis. Thus, the terms "step", "trapezium", or "triangle" index profiles are used for graphs respectively having step, trapezium or triangle shaped profiles. The curves are generally representative of the theoretical or reference profile of the fiber, it being possible for the stresses induced during manufacture of the fiber to give rise to a profile that is significantly different.

To use a fiber in a transmission system, and in particular in a WDM transmission system, it is advantageous for the fiber to have a large effective area in the wavelength range of the multiplex. A large effective area makes it possible to limit power density in the fiber for constant total power, and to limit or to avoid undesirable non-linear effects.

For high data rate systems, it is also useful for the fiber to provide single-mode propagation of the channels of the multiplex. ITU-T G 650 gives a definition of the cutoff wavelength in cable. The theoretical cutoff wavelength of the fiber is generally longer than the cutoff wavelength in cable by several hundred nanometers. The propagation in an optical fiber can be single-mode even if the theoretical cutoff wavelength is greater than the wavelength of the signals used: beyond a distance of a few meters or a few tens of meters, which is short compared with the propagation distances in optical-fiber transmission systems, the secondary modes disappear because of attenuation that is too great. Propagation in the transmission system is then single-mode.

It is also important for the fiber to have sensitivity to bending and to microbending that is as low as possible. Sensitivity to bending is evaluated, as explained in Recommendation ITU-T G.650, by measuring the attenuation caused by winding 100 turns of a fiber about a reel having a radius of 30 mm. Sensitivity to microbending is measured in a manner known per se; it is possible, as below, to measure it relative to a fiber such as the fiber sold by the Applicant under the reference ASMF 200.

In new high data rate WDM transmission systems, it is advantageous to limit the chromatic dispersion gradient within the wavelength range of the multiplex; the aim is to minimize distortion between the channels of the multiplex during transmission.

Dispersion shifted fibers (DSF) have appeared on the market. Those fibers are such that, at the transmission wavelength at which they are used (which in general is different from the 1.3 $\mu$m wavelength for which the dispersion of silica is substantially zero), the chromatic dispersion of the transmitted wave is substantially zero, i.e. the non-zero chromatic dispersion of silica is compensated, hence the term "shifted", by increasing the index difference $\Delta n$ between the core of the fiber and the optical cladding. That index difference makes it possible to shift the wavelength for which chromatic dispersion is zero; it is obtained by inserting dopants into the preform while said preform is being manufactured, e.g. by means of a Modified Chemical vapor Deposition (MCVD) process which is known per se and not described in any more detail herein. The term "non-zero dispersion-shifted fibers" ("NZ-DSFs") is used to designate dispersion-shifted fibers that have non-zero chromatic dispersion for the wavelengths at which they are used. The non-zero value of the chromatic dispersion makes it possible to limit non-linear effects in the fiber, and in particular to limit four-wave mixing between he channels of the multiplex. As explained in EP-A-0 859 247, the problem with DSF fibers is that the chromatic dispersion gradient generally increases with increasing effective area.

EP-A-0 859 247 describes DSF fibers having ring profiles, and explains that, for such fibers, there exists a range in which in the effective area and the chromatic dispersion gradient vary in different directions. The fibers given by way of example have dispersion gradients that are negative and in the range −4.5 ps/(nm.km) to 1.0 ps/(nm.km). They have cutoff wavelengths greater than 1500 nm, for a fiber length of 2 m. That document indicates that such a high value for the cutoff wavelength is not problematic insofar as the cutoff wavelength decreases with increasing propagation distance, and insofar as single-mode propagation is provided for transmission distances of about 1000 km.

In "Practically feasible dispersion flattened fibers produced by VAD technique", ECOC'98 (p.131–132), Y. Yokohama et al propose obtaining an effective area of about 50 $\mu m^2$ and a chromatic dispersion gradient of about 0.026 ps/(nm$^2$.km) by pushing back the cutoff wavelength beyond 1550 nm.

In "Maximum effective area for non-zero dispersion-shifted fiber", OFC'98 ThK3, P. Nouchi proposes a comparative study of the maximum effective area for various fiber profiles, as a function of bending losses, for fixed dispersion and dispersion gradient values. That article shows, in particular, that, with everything else remaining equal, fibers of coaxial-with-ring profile, or of coaxial profile have larger values of effective area. FIG. 3 of that article shows various types of fiber with the corresponding dispersion gradients; the legend indicates that the chromatic dispersion at 1550 nm is equal to 4 ps/(nm.km). Assuming that the chromatic dispersion is substantially linear around the wavelength $\lambda_0$ for which chromatic dispersion is zero, it appears that, in all cases, the $\lambda_0$ wavelength is longer than 1488 nm.

Under the name TrueWave/RS, Lucent proposes a fiber having the following characteristics:

$\lambda_0$ wavelength: 1468 nm;

chromatic dispersion gradient at 1550 nm: 0.045 ps/nm$^2$.km);

chromatic dispersion at 1550 nm: 3.7 ps/(nm.km);

mode diameter at 1550 nm: 8.4 $\mu$m; and effective area at 1550 nm: 55 $\mu m^2$.

Under the trademark LEAF, Corning sells NZ-DSF fibers that, at 1550 nm, have an effective area of 72 $\mu m^2$ and a chromatic dispersion gradient in the range approximately 0.08 ps/(nm$^2$.km) to 0.09 ps/(nm$^2$.km); the chromatic dispersion becomes zero at about 1500 nm.

SUMMARY OF THE INVENTION

The invention proposes an optical fiber that is suitable for being put in a cable, and that offers an advantageous compromise between effective area and chromatic dispersion gradient, in particular because of the choice of the cutoff wavelength. More precisely, the invention provides an optical fiber that is single-mode in cable having the following characteristics for a wavelength of 1550 nm:

an effective area greater than or equal to 60 $\mu m^2$;

chromatic dispersion lying in the range 3 ps/(nm.km) to 14 ps/(nm.km);

a chromatic dispersion gradient in the range 0 ps/(nm$^2$.km) to 0.1 ps/(nm$^2$.km);

a ratio between the effective area and the chromatic dispersion gradient that is greater than 1000 $\mu m^2$.nm$^2$.km/ps; and a zero chromatic dispersion wavelength less than or equal to 1480 nm.

Preferably, the fiber of the invention has chromatic dispersion at 1550 nm that lies in the range 5 ps/(nm.km) to 11 ps/(nm.km), and/or a dispersion gradient of less than 0.07 ps/(nm$^2$.km).

The ratio between the effective area and the chromatic dispersion gradient preferably remains less than 5000 $\mu m^2$.nm$^2$.km/ps.

In an embodiment, the effective area of the fiber is greater than or equal to 70 $\mu m^2$.

In another embodiment, the fiber has bending losses at 1550 nm that are less than or equal to 0.05 dB for 100 turns of the fiber about a radius of 30 mm, and preferably less than or equal to 0.005 dB. It may also have sensitivity to microbending of less than 1.2, and preferably less than 0.8.

Preferably, the fiber has a theoretical cutoff wavelength longer than 1550 nm, and an in-cable cutoff wavelength shorter than 1300 nm.

In an embodiment, the fiber has attenuation at 1550 nm of not more than 0.23 dB/km, and polarization mode dispersion of not more than 0.08 ps.km$^{-0.5}$.

In another embodiment, the fiber has a trapezium-with-ring index profile. In which case, the difference between the index of the central portion of the fiber and the index of the cladding advantageously lies in the range 6×10$^{-3}$ to 9×10$^{-3}$, and the difference between the index of the ring and the index of the cladding lies in the range 2×10$^{-3}$ to 5×10$^{-3}$. It is also possible to make provision for the fiber to be such that the ratio between the radius of the trapezium and the outside radius of the ring lies in the range 0.42 to 0.58. In addition, the ratio between the inside radius of the ring and the outside radius of the ring advantageously lies in the range 0.68 to 0.85. It is also advantageous for the outside radius of the ring to lie in the range 8 $\mu m$ to 10.5 $\mu m$.

In yet another embodiment, the fiber has a coaxial-with-ring index profile. In which case, the fiber advantageously has one or more of the following characteristics:

a difference between the index of the ring and the index of the cladding that lies in the range 0.5×10$^{-3}$ to 5×10$^{-3}$;

a ratio between the inside radius of the ring and the outside radius of the ring that lies in the range 0.65 to 0.85; and an outside radius of the ring that lies in the range 7.5 $\mu m$ to 11.5 $\mu m$.

Finally, the fiber may have a coaxial index profile with a buried outer portion. In which case, it is advantageous for the outside radius of the outer cladding to lie in the range 7.5 $\mu m$ to 9 $\mu m$.

In the case of coaxial-with-ring or coaxial profiles, the fiber advantageously has one or more of the following characteristics:

a difference between the maximum index of the coaxial portion of the fiber and the index of the cladding that lies in the range 7.2×10$^{-3}$ to 10.5×10$^{-3}$;

a difference between the index of the inner cladding and the index of the cladding that lies in the range −6.7×10$^{-3}$ to −4.1×10$^{-3}$; and a ratio between the radius of the central portion and the radius of the coaxial portion that lies in the range 0.35 to 0.55.

The invention also provides a wavelength division multiplexed optical fiber transmission system including such a fiber as the line fiber. It is then also possible to make provision to include dispersion-compensating fiber.

BRIEF DESCRIPTION OF THE DRAWINGS

Other characteristics and advantages of the invention will appear on reading the following description of embodiments of the invention given by way of example and with reference to the accompanying drawing, in which:

FIG. 1 is a diagram showing the trapezium-with-ring index profile of a first embodiment of a fiber of the invention;

FIG. 2 is a diagram showing the coaxial-with-ring index profile of a second embodiment of a fiber of the invention; and FIG. 3 is a diagram showing the coaxial-with-buried-cladding index profile of a third embodiment of

DETAILED DESCRIPTION OF THE INVENTION

The invention proposes a fiber that offers an advantageous compromise between effective area and chromatic dispersion gradient, thereby making it possible to limit the power density in the fiber, without giving rise to distortion between the channels of a multiplex. The fiber also has low bending and microbending losses, which makes it possible to place it in a cable; it provides single-mode propagation when it is placed in this way in a cable.

The possible characteristics of the fiber of the invention are thus as follows:

effective area greater than or equal to 60 $\mu m^2$, or preferably greater than 70 $\mu m^2$;

chromatic dispersion at 1550 nm lying in the range 3 ps/(nm.km) to 14 ps/(nm.km), and preferably in the range 5 ps/(nm.km) to 11 ps/(nm.km);

chromatic dispersion gradient at 1550 nm that is positive and less than 0.1 ps/(nm$^2$.km), and preferably less than or equal to 0.07 ps/(nm$^2$.km);

ratio between the effective area and the chromatic dispersion gradient that is greater than 1000 $\mu m^2$.nm$^2$.km/ps, and preferably less than 5000 $\mu m^2$.nm$_2$.km/ps, or even than 2500 $\mu m^2$.nm$^2$.km/ps;

bending losses at 1550 nm less than 0.05 dB for 100 turns of the fiber about a reel having a radius of 30 mm and preferably less than 0.005 dB;

sensitivity to microbending less than 1.2 relative to the known fiber ASMF 200, and preferably less than 0.8 relative thereto;

zero chromatic dispersion wavelength shorter than 1480 nm;

theoretical cutoff wavelength longer than 1550 nm; and in-cable cutoff wavelength shorter than 1300 nm.

As explained above, the theoretical cutoff wavelength is several hundred nanometers longer than the in-cable cutoff wavelength. It is thus possible to provide the latter two characteristics simultaneously.

The fiber may also have attenuation at 1550 nm that is less than 0.23 dB/km as well as polarization mode dispersion that is not greater than 0.08 ps/km$^{-0.5}$.

With reference to the figures, examples are given below of reference fiber profiles that make it possible to obtain such values. In all of the embodiments, the radii are given in micrometers and measured relative to the axis of the fiber. The indices are measured by the difference relative to the index of the cladding of the fiber.

FIG. 1 is a diagram of a trapezium-with-ring index profile which is used in a first embodiment of the invention for various fibers. In this embodiment, and starting from the center of the fiber, the profile has:

- a central portion of radius $r_1$, with an index $\Delta n_1$, that is substantially constant and that is greater than the index of the cladding;
- a first annular portion surrounding the central portion and extending to a radius $r_2$, and in which the index decreases substantially linearly as a function of the radius; these first two portions forming a trapezium;
- a second annular portion which is of index $\Delta n_3$ that is substantially constant and less than or equal to the index of the cladding, and which extends to a radius $r_3$; this portion being commonly referred to as the "inner cladding"; and
- a third annular portion which is of index $\Delta n_4$ that is substantially constant and greater than the index of the cladding, and which extends to a radius $r_4$; this portion being referred to as the "ring".

The cladding of the fiber extends around the ring.

Table 1 gives possible radius and index values for fibers having a trapezium-with-ring profile. The radii are given in micrometers.

TABLE 1

| $r_1$ | $r_2$ | $r_3$ | $r_4$ | $10^{-3} \cdot \Delta n_1$ | $10^{-3} \cdot \Delta n_3$ | $10^{-3} \cdot \Delta n_4$ |
|---|---|---|---|---|---|---|
| 1.25 | 4.2 | 7.6 | 9.1 | 8.6 | 0 | 4.7 |
| 1.4 | 4.8 | 7.7 | 9.9 | 7.8 | 0 | 2.9 |
| 3.0 | 5.0 | 5.9 | 8.4 | 6.6 | −5.0 | 3.6 |
| 1.7 | 5.7 | 7.85 | 10.2 | 6.4 | 0 | 2.4 |

As shown by the examples, the difference $\Delta n_1$, between the refractive index of the central portion of the fiber and the index of the cladding may lie in the range $6 \times 10^{-3}$ to $9 \times 10^{-3}$. The difference $\Delta n_4$ between the index of the ring and the index of the cladding lies in the range $2 \times 10^{-3}$ to $5 \times 10^{-3}$. As regards the radii, the ratio $r_2/r_4$ lies in the range 0.42 to 0.58, while the ratio $r_3/r_4$ lies in the range 0.68 to 0.85. The radius $r_4$ of the ring may lie in the range 8 µm to 10.5 µm. These characteristics make it possible to manufacture the fiber by conventional methods; by way of comparison, the index difference value of 1% commonly mentioned in the prior art corresponds to a difference of $14.5 \times 10^{-3}$. It can be observed that the invention does not involve high indices, or layers of very small radius, and it thus avoids the problems of manufacture or of excessive attenuation in the fiber.

The fibers obtained for these radius and index values have the characteristics given in the corresponding rows of Table 2. The units are as follows:

- theoretical cutoff wavelength $\lambda_{cth}$: nm;
- zero chromatic dispersion wavelength $\lambda_0$: nm;
- chromatic dispersion gradient C': ps/(nm$^2$.km);
- effective area $S_{eff}$: µm$^2$;
- chromatic dispersion C: ps/(nm.km); and
- bending losses PC: dB The bending losses are measured as indicated above by winding 100 turns of the fiber about a radius of 30 mm, and by measuring the induced losses. The microbending losses $S_{\mu c}$ are measured relative to the fiber ASMF 200 sold by the Applicant, and are therefore without dimensions. The ratio Seff/C' is given in the following dimensions: µm$^2$.nm$^2$.km/ps.

TABLE 2

| $\lambda_{cth}$ | $\lambda_0$ | C | C' | $S_{eff}$ | $S_{eff}$/C' | PC | $S_{\mu c}$ |
|---|---|---|---|---|---|---|---|
| 1810 | 1480 | 4 | 0.061 | 62 | 1010 | <10$^{-5}$ | 0.73 |
| 1780 | 1415 | 8 | 0.058 | 65 | 1130 | <10$^{-5}$ | 0.62 |
| 1600 | 1400 | 8 | 0.050 | 64 | 1280 | <10$^{-5}$ | 0.75 |
| 1770 | 1370 | 12 | 0.060 | 81 | 1330 | <10$^{-5}$ | 0.94 |

FIG. 2 is a diagram showing a coaxial-with-ring profile which is used in a second embodiment of the invention, for various fibers. In this embodiment, and starting from the center of the fiber, the profile has:

- a central portion of radius $r_1$ with an index $\Delta n_1$, that is substantially constant and that is less than or equal to the index of the cladding;
- a first annular portion surrounding the central portion and extending to a radius $r_2$, and with an index $\Delta n_2$ that is substantially constant and greater than the index of the central portion; these first two portions together forming a coaxial profile;
- a second annular portion which is of index $\Delta n_3$ that is substantially constant, and which extends to a radius $r_3$; this portion being referred to as the "inner cladding"; and
- a third annular portion which is of index $\Delta n_4$ that is substantially constant and greater than the index of the cladding, and which extends to a radius $r_4$; this portion being referred to as the "ring".

The cladding of the fiber extends around the ring.

Table 3 gives possible radius and index values for fibers having the coaxial-with-ring profile of FIG. 2; as above, the radii are given in micrometers.

TABLE 3

| $r_1$ | $r_2$ | $r_3$ | $r_4$ | $10^{-3}.\Delta n_1$ | $10^{-3}.\Delta n_2$ | $10^{-3}.\Delta n_3$ | $10^{-3}.\Delta n_4$ |
|---|---|---|---|---|---|---|---|
| 1.45 | 3.7 | 6.4 | 8.2 | −3.0 | 10.0 | −5.0 | 4.6 |
| 1.5 | 3.9 | 6.35 | 8.55 | −2.8 | 9.2 | −4.6 | 3.5 |
| 2.8 | 5.6 | 8.4 | 11.2 | −3.5 | 8.7 | −5.2 | 0.9 |
| 1.5 | 4.0 | 6.5 | 9.3 | 0 | 8.4 | −5.0 | 3.4 |
| 1.95 | 4.9 | 7.6 | 10.9 | −6.2 | 8.8 | −5.3 | 1.8 |
| 2.1 | 5.25 | 7.0 | 8.75 | −1.5 | 7.7 | −6.2 | 3.1 |

Once again, as shown by the examples, the difference $\Delta n_4$ between the index of the ring and the index of the cladding lies in the range $0.5 \times 10^{-3}$ to $5 \times 10^{-3}$. The difference between the maximum index of the coaxial portion and the index of the cladding lies in the range $7.2 \times 10^{-3}$ to $10.5 \times 10^{-3}$. The index difference $\Delta n_3$ lies in the range $-6.7 \times 10^{-3}$ to $-4.1 \times 10^{-3}$. As regards the radii, the ratio $r_1/r_2$ lies in the range 0.35 to 0.55, the ratio $r_2/r_4$ lies in the range 0.42 to 0.58, while the ratio $r_3/r_4$ lies in the range 0.65 to 0.85. The radius $r_4$ of the ring may lie in the range 7.5 µm to 11.5 µm. These characteristics also make it possible to manufacture the fiber by conventional methods.

The fibers obtained for these radius and index have the characteristics given in the corresponding rows of Table 4, with the same units as above.

TABLE 4

| $\lambda_{cth}$ | $\lambda_0$ | C | C' | $S_{eff}$ | $S_{eff}/C'$ | PC | $S_{\mu c}$ |
|---|---|---|---|---|---|---|---|
| 1550 | 1465 | 4 | 0.048 | 65 | 1360 | <10<sup>-5</sup> | 0.60 |
| 1530 | 1445 | 6 | 0.054 | 72 | 1350 | <10<sup>-5</sup> | 0.70 |
| 1700 | 1435 | 8 | 0.066 | 118 | 1785 | <10<sup>-5</sup> | 1.04 |
| 1710 | 1395 | 8 | 0.045 | 70 | 1565 | <10<sup>-5</sup> | 0.69 |
| 1640 | 1425 | 8 | 0.058 | 93 | 1590 | <10<sup>-5</sup> | 0.59 |
| 1700 | 1380 | 12 | 0.065 | 104 | 1620 | <10<sup>-5</sup> | 0.53 |

FIG. 3 is a diagram showing a coaxial-with-buried-cladding profile which is used in a third embodiment of the invention, for various fibers. In this embodiment, the profile has a core with a coaxial profile, as in the profile of FIG. 2. However, it has no ring, and the inner cladding has an index less than the index of the cladding.

Possible radius and index values for fibers having the co-axial-with-buried-cladding profile of FIG. 3 are given in Table 5; as above, the radii are given in micrometers.

TABLE 5

| $r_1$ | $r_2$ | $r_3$ | $10^{-3} \cdot \Delta n_1$ | $10^{-3} \cdot \Delta n_2$ | $10^{-3} \cdot \Delta n_3$ |
|---|---|---|---|---|---|
| 2.45 | 5.3 | 8.4 | -5.9 | 9.2 | -5.9 |
| 2.35 | 5.9 | 7.9 | -4.8 | 7.4 | -6.4 |

As in the examples of FIG. 3, the difference between the maximum index of the coaxial portion and the index of the cladding lies in the range $7.2 \times 10^{-3}$ to $10.5 \times 10^{-3}$ The index difference $\Delta n_3$ lies in the range $-6.7 \times 10^{-3}$ to $-4.1 \times 10^{-3}$. As regards the radii, the $r_1/r_2$ lies in the range 0.35 to 0.55, while the $r_3$ lies in the range 7.2 µm to 10.5 µm. These characteristics once again make it possible to manufacture the fiber by conventional methods.

The fibers obtained for these radius and index values have the characteristics given in Table 6, with the same units as above.

TABLE 6

| $\lambda_{cth}$ | $\lambda_0$ | C | C' | $S_{eff}$ | $S_{eff}/C'$ | PC | $S_{\mu c}$ |
|---|---|---|---|---|---|---|---|
| 1630 | 1430 | 8 | 0.064 | 102 | 1590 | <10<sup>-5</sup> | 0.78 |
| 1700 | 1385 | 12 | 0.063 | 120 | 1890 | <10<sup>-5</sup> | 0.87 |

In all of the examples of Tables 1, 3, and 5, variations of $5 \times 10^{-3}$ in the refractive indices make it possible to obtain similar results. The same applies to the radii which may vary individually by 10% relative to the values given while obtaining analogous results.

Profiles other than those which are given by way of example may make it possible to obtain fibers having the characteristics of the invention. The invention may be manufactured by the person skilled in the art by using known techniques such as MCVD, or any other techniques commonly used for manufacturing optical fibers.

The fiber of the invention may advantageously be used as a line fiber in transmission systems, and in particular in WDM transmission systems. It is also possible, in a system using such a line fiber, to provide dispersion-compensating fiber disposed at regular intervals in the system for limiting dispersion variations.

Naturally, the present invention is not limited to the embodiments described and shown, but rather numerous variants of it are accessible to the person skilled in the art.

What is claimed is:

1. An optical fiber that is single-mode in cable and that has the following characteristics for a wavelength of 1550 nm:
   an effective area greater than or equal to 60 µm$^2$;
   chromatic dispersion lying in the range 5 ps/(nm.km) to 11 ps/(nm.km);
   a chromatic dispersion gradient in the range 0 ps/(nm$^2$.km) to 0.1 ps/(nm$^2$.km);
   a ratio between the effective area and the chromatic dispersion gradient that is greater than 1000 µm$^2$.nm$^2$.km/ps; and
   a zero chromatic dispersion wavelength less than or equal to 1480 nm.

2. A fiber according to claim 1, characterized in that, at 1550 nm, it has a dispersion gradient of less than 0.07 ps/(nm$^2$.km).

3. A fiber according to claim 1, characterized in that it has a ratio between the effective area and chromatic dispersion gradient of less than 5000 µm$^2$.nm$^2$.km/ps.

4. A fiber according to claim 1, characterized in that it has an effective area greater than or equal to 70 µm$^2$.

5. A wavelength dispersion multiplexed optical fiber transmission system including a fiber according to claim 2 as a line fiber.

6. A transmission system according to claim 5, further including dispersion-compensating fiber.

7. An optical fiber that is single-mode in cable and that has the following characteristics for a wavelength of 1550 nm:
   an effective area greater than or equal to 60 µm$^2$;
   chromatic dispersion lying in the range 3 ps/(nm.km) to 14 ps/(nm.km);
   a chromatic dispersion gradient in the range 0 ps/(nm$^2$.km) to 0.1 ps/(nm$^2$.km);
   a ratio between the effective area and the chromatic dispersion gradient that is greater than 1000 µm$^2$.nm$^2$.km/ps; and
   a zero chromatic dispersion wavelength less than or equal to 1480 nm;
   characterized in that it has bending losses at 1550 nm that are less than or equal to 0.05 dB for 100 turns of the fiber about a radius of 30 mm.

8. A fiber according to claim 7, characterized in that the bending losses are less than or equal to 0.005 dB.

9. An optical fiber that is single-mode in cable and that has the following characteristics for a wavelength of 1550 nm:
   an effective area greater than or equal to 60 µm$^2$;
   chromatic dispersion lying in the range 3 ps/(nm.km) to 14 ps/(nm.km);
   a chromatic dispersion gradient in the range 0 ps/(nm$^2$.km) to 0.1 ps/(nm$^2$.km);
   a ratio between the effective area and the chromatic dispersion gradient that is greater than 1000 µm$^2$.nm$^2$.km/ps; and a zero chromatic dispersion wavelength less than or equal to 1480 nm;

characterized in that it has a sensitivity to microbending of less than 1.2.

10. A fiber according to claim 9, characterized in that it has a sensitivity to microbending of less than 0.8.

11. An optical fiber that is single-mode in cable and that has the following characteristics for a wavelength of 1550 nm:

an effective area greater than or equal to 60 $\mu m^2$;

chromatic dispersion lying in the range 3 ps/(nm.km) to 14 ps/(nm.km);

a chromatic dispersion gradient in the range 0 ps/(nm$^2$.km) to 0.1 ps/(nm$^2$.km);

a ratio between the effective area and the chromatic dispersion gradient that is greater than 1000 $\mu m^2$.nm$^2$.km/ps; and a zero chromatic dispersion wavelength less than or equal to 1480 nm; characterized in that it has a theoretical cutoff wavelength longer than 1550 nm.

12. An optical fiber that is single-mode in cable and that has the following characteristics for a wavelength of 1550 nm:

an effective area greater than or equal to 60 $\mu m^2$;

chromatic dispersion lying in the range 3 ps/(nm.km) to 14 ps/(nm.km);

a chromatic dispersion gradient in the range 0 ps/(nm$^2$.km) to 0.1 ps/(nm$^2$.km);

a ratio between the effective area and the chromatic dispersion gradient that is greater than 1000 $\mu m^2$.nm$^2$.km/ps; and a zero chromatic dispersion wavelength less than or equal to 1480 nm;

characterized in that it has an in-cable cutoff wavelength shorter than 13000 nm.

13. An optical fiber that is single-mode in cable and that has the following characteristics for a wavelength of 1550 nm:

an effective area greater than or equal to 60 $\mu m^2$;

chromatic dispersion lying in the range 3 ps/(nm.km) to 14 ps/(nm.km);

a chromatic dispersion gradient in the range 0 ps/(nm$^2$.km) to 0.1 ps/(nm$^2$.km);

a ratio between the effective area and the chromatic dispersion gradient that is greater than 1000 $\mu m^2$.nm$^2$.km/ps; and a zero chromatic dispersion wavelength less than or equal to 1480 nm;

characterized in that it has attenuation at 1550 nm of not more than 0.23 dB/km.

14. An optical fiber that is single-mode in cable and that has the following characteristics for a wavelength of 1550 nm:

an effective area greater than or equal to 60 $\mu m^2$;

chromatic dispersion lying in the range 3 ps/(nm.1.km) to 14 ps/(nm.km);

a chromatic dispersion gradient in the range 0 ps/(nm$^2$.km) to 0.1 ps/(nm2.km);

a ratio between the effective area and the chromatic dispersion gradient that is greater than 1000 $\mu m^2$.nm$^2$.km/ps; and a zero chromatic dispersion wavelength less than or equal to 1480 nm;

characterized in that it has polarization mode dispersion of not more than 0.08 ps.km$^{-0.5}$.

15. An optical fiber that is single-mode in cable and that has the following characteristics for a wavelength of 1550 nm:

an effective area greater than or equal to 60 $\mu m^2$;

chromatic dispersion lying in the range 3 ps/(nm.km) to 14 ps/(nm.km);

a chromatic dispersion gradient in the range 0 ps/(nm$^2$.km) to 0.1 ps/(nm$^2$.km);

a ratio between the effective area and the chromatic dispersion gradient that is greater than 1000 $\mu m^2$.nm$^2$.km/ps; and a zero chromatic dispersion wavelength less than or equal to 1480 nm;

characterized in that it has a trapezium-with-ring index profile.

16. A fiber according to claim 15, characterized in that the difference ($\Delta n_1$) between an index of a central portion of the fiber and the index of a cladding lies in the range 6×10$^{-3}$ to 9×10$^{-3}$.

17. A fiber according to claim 15 characterized in that the difference ($\Delta n_4$) between the index of the ring and the index of a cladding lies in the range 2×10$^{-3}$ to 5×10$^{-3}$.

18. A fiber according to claim 15, characterized in that a ratio ($r_2/r_4$) between a radius ($r_2$) of the trapezium and an outside radius ($r_4$) of the ring lies in the range 0.42 to 0.58.

19. A fiber according to claim 15, characterized in that a ratio ($r_3/r_4$) between an inside radius ($r_3$) of the ring and an outside radius ($r_4$) of the ring lies in the range 0.68 to 0.85.

20. A fiber according to claim 15, characterized in that an outside radius ($r_4$) of the ring lies in the range 8 $\mu m$ to 10.5 $\mu m$.

21. An optical fiber that is single-mode in cable and that has the following characteristics for a wavelength of 550 nm:

an effective area greater than or equal to 60 $\mu m^2$;

chromatic dispersion lying in the range 3 ps/(nm.km) to 14 ps/(nm.km);

a chromatic dispersion gradient in the range 0 ps/(nm$^2$.km) to 0.1 ps/(nm$^2$.km);

a ratio between the effective area and the chromatic dispersion gradient that is greater than 1000 $\mu m^2$.nm$^2$.km/ps; and a zero chromatic dispersion wavelength less than or equal to 1480 nm;

characterized in that it has a coaxial-with-ring index profile.

22. A fiber according to claim 21, characterized in that the difference ($\Delta n_4$) between the index of the ring and the index of a cladding lies in the range 0.5×10$^{-3}$ to 5×10$^{-3}$.

23. A fiber according to claim 21, characterized in that a ratio ($r_3/r_4$) between an inside radius ($r_3$) of the ring and an outside radius ($r_4$) of the ring lies in the range 0.65 to 0.85.

24. A fiber according to claim 21, characterized in that an outside radius ($r_4$) of the ring lies in the range 7.5 $\mu m$ to 11.5 $\mu m$.

25. A fiber according to claim 21, characterized in that the difference ($\Delta n_2$) between the index of the coaxial portion of the fiber and the index of a cladding lies in the range 7.2×10$^{-3}$ to 10.5×10$^{-3}$.

26. A fiber according to claim 21, characterized in that the difference ($\Delta n_3$) between the index of an inner cladding and the index of cladding lies in the range −6.7×10$^{-3}$ to −4.1×10$^3$.

27. A fiber according to claim 21, characterized in that a ratio ($r_1/r_2$) between a radius ($r_1$) of the central portion and a radius ($r_2$) of the coaxial portion lies in the range 0.35 to 0.55.

28. An optical fiber that is single-mode in cable and that has the following characteristics for a wavelength of 1550 nm:

an effective area greater than or equal to 60 $\mu m^2$;

chromatic dispersion lying in the range 3 ps/(nm.km) to 14 ps/(nm.km);

a chromatic dispersion gradient in the range 0 ps/(nm$^2$.km) to 0.1 ps/(nm$^2$.km);

a ratio between the effective area and the chromatic dispersion gradient that is greater than 1000 $\mu m^2$.nm$^2$.km/ps; and a zero chromatic dispersion wavelength less than or equal to 1480 nm;

characterized in that it has a coaxial index profile with a buried outer portion.

29. A fiber according to claim 28, characterized in that an outside radius ($r_3$) of an outer cladding lies in the range 7.5 $\mu$m to 9 $\mu$m.

* * * * *